2,808,947

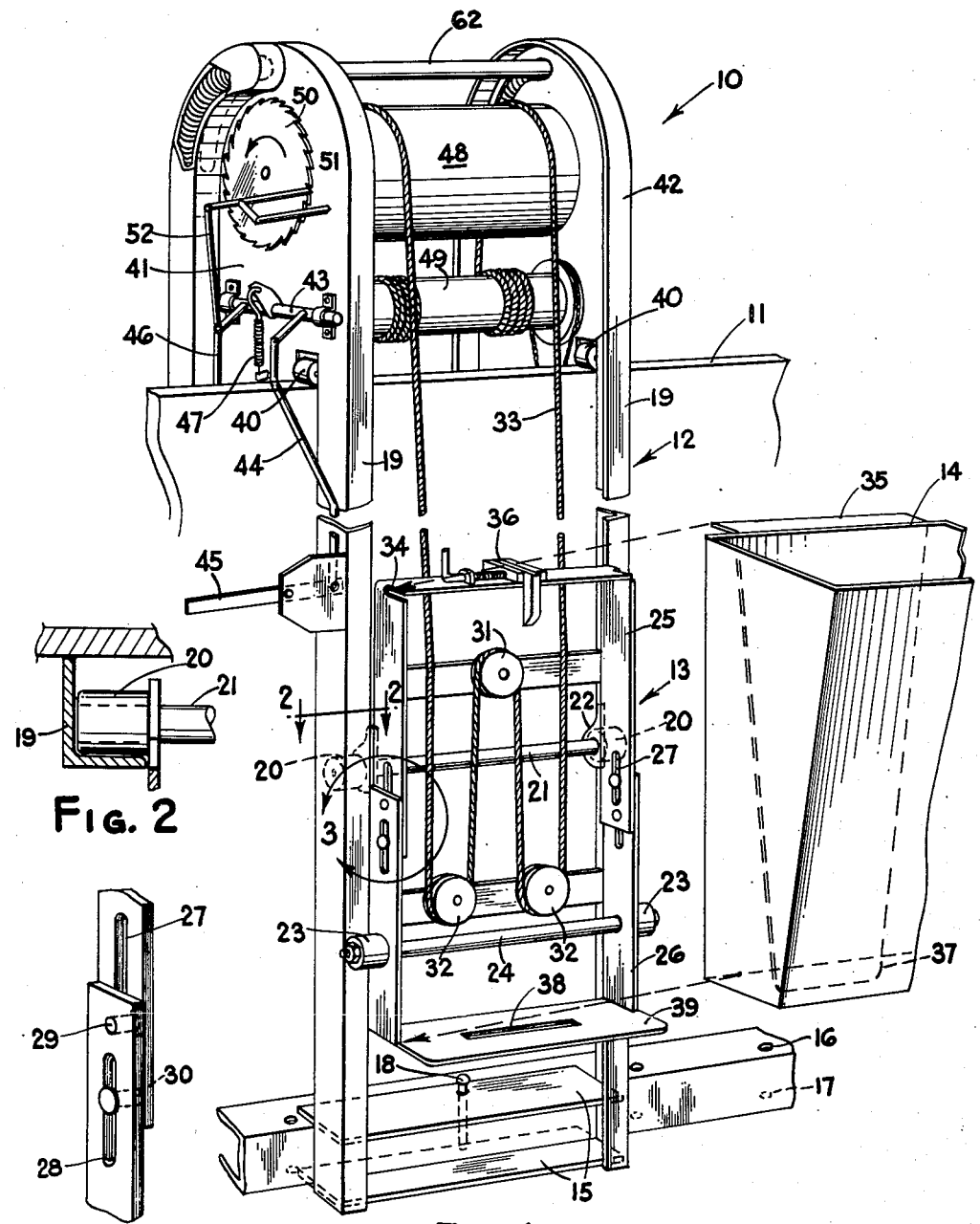

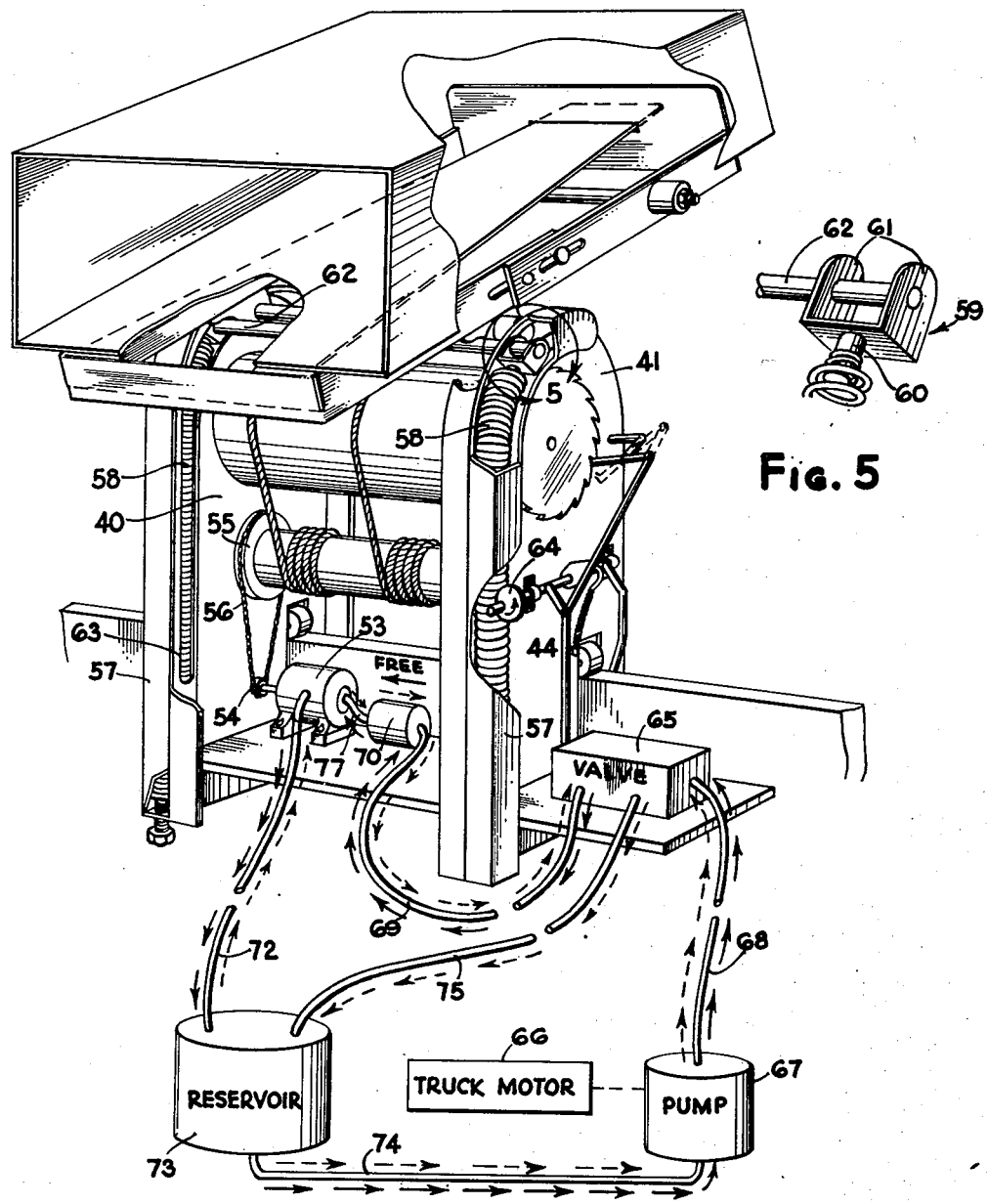

LOADING APPARATUS FOR VEHICLES

William J. Shippy, Whittier, Calif.

Application November 29, 1955, Serial No. 549,611

9 Claims. (Cl. 214—75)

This invention generally relates to a loading apparatus for vehicles, and more particularly to a separate loading unit adapted for mounting on the upper portion of a vehicle, which is advantageously employed in the loading of refuse, rubbish, plaster materials, and the like.

For illustrative purposes, the invention will be described with reference to loading rubbish. At the present time, most rubbish collection systems require manual lifting of the rubbish container to a position in which its contents may be discharged into the body of a truck. Certain efforts have been made to mechanize the loading process, and in this regard trucks have been built having integrally loaders thereon. The problem, however, of providing a unit which may be readily mounted on a conventional truck body without substantial modification and expensive installation cost has not been solved. Side loader units, that is, units adaptable for mounting or hanging on the dump body sides of the truck or on the back of the truck body, which are now available appear to be cumbersome to handle and operate as well as to install, and they are not tailored to the requirements of the rubbish and refuse collection industries, in which collections must be made in a minimum amount of time.

It is, therefore, an object of the present invention to provide a loading apparatus for a vehicle which may be readily mounted on a conventional vehicle side wall without significant modification thereto and without the need of an expensive installation procedure.

Another object of the present invention is to provide a loading apparatus for vehicles in which the loading and dumping cycle is accomplished automatically and in a minimum amount of time.

Another object of the present invention is to provide a vehicle mounted loader which may be adjustably positioned at any given point along the side walls of the vehicle.

A still further object of the present invention is to provide a vehicle mounted loader which is simple and positive in its operation, and which will operate satisfactorily over a long period of time with only limited maintenance.

In one application, these and other objects and advantages of the present invention are generally attained by providing a side mounted truck loader which includes a head assembly adapted for positioning on the upper railing of a dump body side of the truck. A track assembly is hung from and merges into the head assembly and extends downwardly therefrom to connect with the lower side railing of the truck body. In position for rolling movement on the track assembly is a carriage assembly unit, which in turn is adapted to receive a dumping bucket or barrel. Hydraulic actuating means, operable from the truck motor, for example, are associated with the loader. Winch means are embodied in the head assembly and are designed for actuation by the hydraulic means. The winch means, in turn, are connected to the carriage assembly, for example, as by a pulley-cable arrangement, and are adapted to move the carriage assembly up and down on the track assembly, whereby the bucket carried thereon is correspondingly moved between a dumping position and a loading position, respectively.

A better understanding of the present invention will be had by reference to the drawings in which the preferred general embodiment is shown for illustrative purposes, and in which:

Figure 1 is an outer perspective view of the side mounted truck loader of the present invention;

Figure 2 is a view taken in the direction of the arrows 2—2 of Figure 1 illustrating a cross section of the track assembly;

Figure 3 is an enlarged view of the slotted connection used in the carriage assembly and enclosed in the circular arrow 3 of Figure 1;

Figure 4 is a back perspective view, partially schematic, of the side mounted truck loader shown in Figure 1; and, Figure 5 is an enlarged view of the spring yoke in the encircled arrowed portion 5 of Figure 4.

There is shown in Figure 1 the side mounted truck loader of the present invention, including a head assembly 10 mounted on an upper railing 11 of a dump body side of a truck. A track assembly generally designated by 12, merges into and extends downwardly from the head assembly 10 along the side of the truck body. Positioned for rolling movement on the track assembly is a carriage assembly generally denoted by the numeral 13. The carriage assembly 13, in the embodiment shown, is adapted to receive a dumping bucket 14 shown spaced therefrom for illustrative purposes.

The track assembly 12 has rigidly secured thereto at its lower end a pair of transverse frame members 15 for positioning about the lower side railing 16 of the truck body. In this respect, the side railing 16 is provided with a plurality of spaced drilled holes 17 adapted to receive a locking pin 18, which may be passed through the transverse members 15 and a particular aligned hole 17 to firmly position the track assembly at a given point along the side of the dump truck body.

The track assembly itself includes two spaced guiding tracks 19, which are angular in cross section, as more clearly shown in the view of Figure 2.

The carriage assembly 13 includes a pair of inner guide wheels or rollers 20 connected to an axle 21, which are rotatively secured to the carriage assembly through a pair of brackets 22, and adapted for rolling engagement with the inner surface of the respective adjacent tracks 19. Similarly, a pair of outer guide wheels 23 are rotatively connected to a lower portion of the carriage assembly 13 through an axle 23 and are disposed for rolling engagement with the outer surface of the tracks 19.

The body of the carriage assembly 13 itself includes a generally upper member 25 and a similar lower member 26 in telescoping relationship with each other. For this purpose, as more clearly shown in Figure 3, the upper member 25 is provided with a pair of slots 27 in its opposite side walls, and similarly the lower member 26 is provided with a pair of slots 28 in its opposite side walls. In each side wall of the lower member a rivet pin 29 is rigidly secured and passes through the respective adjacent slot 27 of the supper member for relative up and down movement therein. Similarly, a rivet pin 30 is rigidly secured within the upper member 25 and passes through the adjacent slot 28 of the lower member for up and down movement therein. As a consequence of this slotted telescoping arrangement, the bucket 14 may be firmly held within the carriage assembly 13 while the loading and dumping cycle is being accomplished, in a manner that will become clearer as the specification proceeds.

The carriage assembly 13 also includes an upper pulley 31 secured to the upper member 25 and a pair of lower pulleys 32 spaced on and secured to the lower member 26. A cable 33 passes around the upper pulley 31 and around the lower pulleys 32, as shown, to thereafter extend upwardly to the head assembly 10.

For mounting of the bucket 14 on the carriage assembly 13, the upper member 25 of the carriage assembly is provided with a notch 34 adapted to receive a tongue 35 projecting from the upper portion of the bucket 14. Thereafter, a spring loaded handle 36 may be clamped down over the inner side of the bucket. The lower portion of the bucket has a downwardly extending tongue 37 for locking into a groove 38 in a bottom plate 39 of the lower member 26.

The head assembly 10 is schematically shown as including a pair of wheels 40 mounted on the upper truck railing, whereby the loader may be moved along the truck body side to thereafter be secured in a particular position for insertion of the locking pin 18 as previously described. The head assembly further includes a pair of flanged, arcuate side plates 41 and 42, with the flanged portions thereof shown as being integrally connected to the corresponding downwardly extending tracks 19. Side plate 41 has rotatively mounted thereon an operating mechanism 43. A control rod 44 extends downwardly from the operating mechanism 43, and has attached at its lower end a control arm 45. The operating mechanism 43 is thus, in the schematic embodiment shown, adapted for angular movement in response to vertical actuation of the control 45. The operating mechanism 43 additionally has connected thereto a valve actuating arm 46 and a spring means 47, the latter being provided to retain the operating mechanism in a given position in correspondence with the position of the control arm 45.

Rotatively secured between the opposing side plates 41 and 42 is a cable roller or drum 48 and a driving cable reel 49. The drum 48 is adapted to guide the cable 33 and at the same time properly position the carriage assembly 13 as it is moved upwardly toward a dumping position. For purpose of illustration, a ratchet wheel 50 is shown as being schematically attached at one end of the drum 48, and as being engaged by a pawl 51, which is in turn connected through a linkage 52 to the operating mechanism 43. In actual practice, the ratchet wheel 50 may be located in any convenient position and operated by any convenient linkage means.

The details of the head assembly construction and its co-operative action during the loading and dumping cycle may be more clearly described with reference to Figure 4, in which the same parts are denoted by corresponding numerals. Supported within the head assembly 10 is a hydraulic motor 53 having a shaft connected sprocket 54 adapted to drive a sprocket 55 on the reel 49, as by means of a chain 56. By employing a chain and sprocket arrangement, a positive speed reducing drive is achieved although it is feasible to substitute other speed reducing drive means such as gears or V-belt-pulley constructions.

The head assembly 10 has welded to its opposite side plates 41 and 42 a pair of channeled, spring cover plates 57 adapted to respectively confine a pair of helical springs 58. As best shown in Figure 5, the springs 58 are held at their upper ends by a pair of yokes 59 and are provided with adjusting bolts at their lower ends. The yokes 59 include a downwardly extending retaining pin 60 for positioning within the helical spring 58 and a pair of upwardly extending ears 61 having central apertures to receive a transverse kickback bar 62 extending between the side plates 41 and 42. The kickback bar 62 is adapted to move a given distance along the inner periphery of the opposed side plates 41 and 42, between limits determined by the length of oppositely disposed slots 63 formed in the inner sides of the cover plates 57. The kickback bar 62 in Figure 4 is shown in its uppermost postion. When it moves downwardly towards its lower position, it is adapted to contact a cam member 64 and to rotate the cam member in the direction of the arrow shown thereon, and to in turn rotate the operating mechanism 43 to which the cam member 64 is attached. At the time this action occurs, the valve actuating arm 46 will be moved upwardly to result in a different valving arrangement within a valve box 65.

The hydraulic actuating means for the apparatus is schematically shown in Figure 4 as including a truck motor 66 adapted to drive a hydraulic pump 67 to force fluid through a conduit 68 to the valve 65. As indicated by the solid line arrows, the fluid thereafter flows through a conduit 69 to pass through a flow control device 70, through another conduit 71 to the hydraulic motor 53. Upon leaving the motor, the fluid passes through a conduit 72 to a reservoir 73 from which it is again withdrawn through a conduit 74 back to the pump 67. This latter part of flow occurs at the time the control arm 45 of Figure 1 is actuated downwardly to rotate the operating mechanism 43 and actuate valve 65.

Under the set of conditions when the cam member 64 is actuated by the kickback bar 62 to operate the valve actuating arm 46 upwardly, all ports in the valve are actuated to an open position and the path of flow occurs in a direction as indicated by the dotted line arrows. Thus, fluid is caused to pass in a reverse direction through the hydraulic motor 53, back through the conduit 71, to in turn pass through the flow control device 70, back through the conduit 69 to the valve 65. It completes its circuit by then traveling through a conduit 75 to the reservoir 73 and up through the conduit 72 back to the hydraulic motor 53. Simultaneously a flow may also occur from reservoir 73 through conduit 74 to the pump 67, and thereafter through conduit 68 to the valve box 65.

In operation of the loader, the bucket 14 is first mounted on the carriage assembly 13 in a manner previously described. Of course, other co-operating fastenings would be provided on the carriage assembly in the event a drum type container were used. After the bucket 14 is positioned in the groove 38, the upper member 25 of the carriage assembly is telescoped downwardly towards the lower member 26, whereby the bracket handle 36 disposed on the top of the member 25 serves to clamp over the bucket. Thus, the bucket 14 is firmly positioned between the handle 36 and the groove 38 of the carriage assembly.

As soon as the bucket 14 has been filled with rubbish or other material, the control arm 45 is actuated downwardly to in turn effect angular movement of the operating mechanism 43 and the valve actuating arm 46 secured thereto. In consequence, the valve 65 will be open to permit flow in the direction of solid line arrows through the hydraulic motor 53. The reel 49 will then begin to turn as a consequence of the sprocket 55 secured thereto being revolved by the chain 56 connected to the motor sprocket 54. As the reel 49 begins to turn, the cable 33 will wind over the drum 48 onto the reel 49 and cause the carriage assembly 13 to be drawn up the track assembly 12. As the carriage assembly 13 begins to move over the arcuate flanges of the side plates 41 and 42 of the head assembly, its outer guide wheels 23 will leave the tracks 19, and the brackets 22 on the carriage 13 will come into ramming contact with the kickback bar 62, whereby the bucket 14 will be in a position as shown in Figure 4.

At this point the reel 49 will overcome the force of the springs 58, and the carriage assembly 13 will force the kickback bar 62 down through the slits 63 and act to compress the springs 58. When the kickback bar 62 has been forced downwardly to a point where it contacts the cam member 64, the valve actuating arm 46 will be forced upwardly to in turn change the direction of fluid flow through the valve 65. At the time this movement occurs, as the motor 53 is no longer exerting a torque overcoming the force of the springs 58, the springs 58 will tend to expand to thereby force the carriage assembly 13 back over the head assembly 10 down onto the track assembly 12, assuming the weight of the bucket has been relieved by a dumping of its contents. As this action occurs, the reel 49 will, of course, unwind the cable 33 and at the same time drive the hydraulic motor 53 in an opposite direction, resulting in the path of fluid flow shown by the dotted line arrows.

Thus, as the carriage assembly 13 moves back down the track assembly 12, its rate of travel will be proportional to the flow rate through the closed circuit as indicated by the dotted line arrows, and the rate of travel may correspondingly be adjusted by controlling the flow rate and the corresponding reverse rotation of the hydraulic motor 44, whereby a certain dynamic braking effect is achieved. The flow control device 70 is positioned in the hydraulic circuit for this purpose. This flow control device is designed to have substantially no resistance to flow in the direction of the solid line arrows, and on the other hand may be adjusted to have a predetermined resistance to flow in the direction of the dotted line arrows, to in turn control the reverse rotation of the motor 53 and the corresponding speed of the carriage assembly 13 as it moves back down the track assembly 12.

It will be appreciated that as the carriage assembly moves up to a dumping position, the ratchet wheel 50 will be rotated and the pawl 51 engaged thereby so that the carriage assembly 13 will be prevented from completing its return cycle back to a loading position in the event the pawl 51 is not disengaged from a ratchet wheel 50. For this reason, at the same time the cam member 64 effects movement of the valve actuating arm 46 through the operating mechanism 43, it will also effect movement of the connecting ratchet wheel linkage 52 to release the pawl 51 from the ratchet wheel and thus permit downward movement of the carriage assembly 13. Normally, the ratchet wheel 50 is used as a means of retaining the bucket 14 in the position of Figure 4, as the truck is being moved from one location to another as rubbish collections are being made.

The employment of an upper pulley 31 in co-operation with a pair of lower pulleys 32 on the carriage assembly serves as an effective means of retaining the upper member 25 in contracted telescoping relationship with the lower member 26, whereby the bucket 14 is firmly held between the handle 36 and the groove 38 during movement of the carriage assembly 13 either upwardly or downwardly on the track assembly 12. Again, depending upon the particular rubbish container being used, the means of retaining the bucket on the carriage assembly 13 may be varied and it may not be necessary to include the three pulley arrangement shown.

The structural details and mechanical linkages shown are merely meant to be illustrative for purposes of description of the invention, and it will be apparent that many modifications and changes can be made without departing from the spirit and scope of the present invention. In this respect although spring means are used in the preferred embodiment for urging the carriage assembly back down the track assembly, it is equally feasible to employ other equivalent force means in the form of a piston—air cylinder arrangement, for example.

It is evident that the present invention for a vehicle loading apparatus is susceptible of relatively economical fabrication and may be easily installed with slight modifications on existing bodies of conventional vehicles.

What is claimed is:

1. A vehicle mounted loader comprising, in combination: a head assembly positioned on the upper portion of said vehicle; a track assembly hung from said head assembly and extending downwardly to a lower portion of said vehicle; material carrying means disposed for guided movement on said track assembly; hydraulic actuating means associated with said loader; winch means associated with said loader and adapted for actuation by said hydraulic means; said winch means being connected to said material carrying means and adapted for powered raising and controlled lowering of said material carrying means on said track assembly between a dumping position and a loading position, respectively; valve means included in said hydraulic means; and, control means associated with said loader and responsive to movement of said material carrying means towards said dumping position to operate said valve means.

2. A vehicle mounted loader, according to claim 1 in which spring means are disposed in said head assembly and are adapted to be compressed as said material carrying means attains said dumping position.

3. A vehicle mounted loader, comprising, in combination: a source of pressurized fluid associated with said vehicle; a head assembly positioned on the upper railing of said vehicle; a track assembly hung from said head assembly and extending downwardly to a lower portion of said vehicle; a carriage assembly disposed for guided movement on said track assembly and adapted to receive a container; hydraulic actuating means associated with said loader; control means associated with said loader, said control means being adapted to regulate the actuation of said hydraulic means; winch means provided in said head assembly and adapted for actuation by said hydraulic means, said winch means being connected to said carriage assembly and adapted for powered raising and controlled lowering of said carriage assembly on said track assembly between a dumping position and loading position, respectively; said hydraulic means including a hydraulic motor drivingly connected to said winch means; valve means interposed between said source of pressurized fluid and said hydraulic motor, said valve means being responsive to said control means to regulate said hydraulic motor; and, an operating mechanism and linkage disposed in said head assembly to interconnect said valve means and said control means.

4. A vehicle mounted loader, according to claim 3, in which said operating mechanism and linkage includes means responsive to movement of said carriage assembly towards said dumping position to operate said valve means.

5. A vehicle mounted loader comprising, in combination: a head assembly adapted for movable positioning on an upper portion of said vehicle; a track assembly hung from and merging into said head assembly, said track assembly extending downwardly to connect with a lower portion of said vehicle; a carriage assembly disposed for rolling guided movement on said track assembly and adapted to receive a container, said carriage assembly including an upper member and a lower member, in telescoping relationship collectively adapted to engage and secure said container; hydraulic actuating means associated with said loader; winch means provided in said head assembly and adapted for actuation by said hydraulic means, said winch means being connected to said carriage assembly and adapted for powered raising and controlled lowering of said carriage assembly on said track assembly between a dumping position and loading position, respectively; control means associated with said loader and adapted to regulate the actuation of said hydraulic means; and, spring means disposed in said head assembly and responsive to movement of said carriage assembly to force said carriage assembly back toward said loading position after said carriage assembly as attained said dumping position.

6. A vehicle mounted loader, according to claim 5, in which said upper member and said lower member, respectively, include juxtapositioned slots, in which a first pin is coupled to said upper member and extends through one slot in the lower member and in which a second pin is coupled to said lower member and extends through the other slot in said upper member whereby the relative telescoping movement of said upper member and said lower member is limited according to movement of said first pin and said second pin in said one slot and said other slot, respectively.

7. A vehicle mounted loader, according to claim 5, in which said spring means are disposed in a peripheral portion of said head assembly, and in which a transverse bar is positioned in said head assembly and disposed for compression of said spring means as said carriage assembly attains said dumping position.

8. In a vehicle mounted loader, hydraulic actuating means comprising: a hydraulic pump; a valve connected to said pump; a hydraulic motor connected to said valve; reservoir means interposed between said hydraulic motor and said pump; and, a fluid control device interposed between said hydraulic motor and said valve designed to enable free flow in one direction and adjustable flow in the opposite direction therethrough.

9. The subject matter of claim 8, in which a fluid by-pass is provided between said reservoir means and said valve, and in which said valve may be operated to enable flow from said valve to said reservoir means, to said motor, and thereafter in a reverse direction through said flow control device.

References Cited in the file of this patent

UNITED STATES PATENTS

| | | |
|---|---|---|
| 1,292,670 | Wesley | Jan. 28, 1919 |
| 1,492,675 | Clark et al. | May 6, 1924 |
| 1,763,499 | Bolger | June 10, 1930 |
| 1,820,526 | Caldwell | Aug. 25, 1931 |
| 1,920,243 | Casper | Aug. 1, 1933 |
| 2,522,441 | Galloway et al. | Sept. 12, 1950 |

FOREIGN PATENTS

| | | |
|---|---|---|
| 395,411 | Great Britain | July 17, 1933 |